US007614087B2

(12) United States Patent
Nakano

(10) Patent No.: US 7,614,087 B2
(45) Date of Patent: Nov. 3, 2009

(54) APPARATUS, METHOD AND COMPUTER PROGRAM FOR CONTROLLING USE OF A CONTENT

(75) Inventor: Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 10/667,872

(22) Filed: Sep. 22, 2003

(65) Prior Publication Data

US 2004/0059937 A1 Mar. 25, 2004

(30) Foreign Application Priority Data

Sep. 24, 2002 (JP) ............................ P2002-277661

(51) Int. Cl.
*G06F 7/04* (2006.01)
(52) U.S. Cl. .............................. 726/28; 726/27; 726/31
(58) Field of Classification Search .................. 726/26, 726/28, 27, 31; 705/51, 54, 59
See application file for complete search history.

(56) References Cited

U.S. PATENT DOCUMENTS

| | | | | |
|---|---|---|---|---|
| 5,638,443 A | * | 6/1997 | Stefik et al. | 705/54 |
| 5,671,412 A | * | 9/1997 | Christiano | 707/104.1 |
| 5,845,065 A | * | 12/1998 | Conte et al. | 726/31 |
| 6,148,292 A | * | 11/2000 | Reisinger et al. | 705/30 |
| 6,327,652 B1 | * | 12/2001 | England et al. | 713/2 |
| 6,327,707 B1 | * | 12/2001 | McKeeth et al. | 717/174 |
| 6,385,596 B1 | * | 5/2002 | Wiser et al. | 705/51 |
| 6,453,418 B1 | * | 9/2002 | Ooki et al. | 726/27 |
| 6,470,085 B1 | * | 10/2002 | Uranaka et al. | 380/231 |
| 6,574,715 B2 | * | 6/2003 | Challenger et al. | 711/141 |
| 6,726,100 B2 | * | 4/2004 | Lauper et al. | 235/380 |
| 6,792,113 B1 | * | 9/2004 | Ansell et al. | 380/284 |
| 6,868,497 B1 | * | 3/2005 | Levy | 726/31 |
| 6,954,830 B2 | * | 10/2005 | Yamada et al. | 711/154 |
| 7,016,496 B2 | * | 3/2006 | Koch | 380/239 |
| 7,020,704 B1 | * | 3/2006 | Lipscomb et al. | 709/226 |
| 7,062,045 B2 | * | 6/2006 | Riddick et al. | 380/44 |

(Continued)

FOREIGN PATENT DOCUMENTS

JP 05-346851 12/1993

(Continued)

*Primary Examiner*—Kimyen Vu
*Assistant Examiner*—April Y Shan
(74) *Attorney, Agent, or Firm*—Finnegan, Henderson, Farabow, Garrett & Dunner, L.L.P.

(57) ABSTRACT

A content usage control apparatus prevents a content managed by an end user from being illegally used. To prevent a content from being used by an apparatus or user other than an authorized apparatus or user, a content usage control apparatus registers the authorized apparatus or user and determines, before providing the content, whether the content is going to be provided to the authorized apparatus or user. The content usage control apparatus also has the capability of imposing a limitation on rewriting of registration. The above-described capabilities of the content usage control apparatus make it possible to protect copyright of information to be provided. A specific example of the content usage control apparatus is a server which stores contents such as movie contents or music contents, and may be used in a system in which a content is provided in response to a request from a client such as a portable telephone, a TV set, or a personal computer, connected to the server.

18 Claims, 16 Drawing Sheets

U.S. PATENT DOCUMENTS

| | | | |
|---|---|---|---|
| 7,103,663 B2 * | 9/2006 | Inoue et al. | 709/225 |
| 7,167,840 B1 * | 1/2007 | Seidman et al. | 705/52 |
| 7,174,568 B2 * | 2/2007 | Chatani et al. | 726/27 |
| 7,243,241 B1 * | 7/2007 | Katsumata et al. | 713/193 |
| 7,266,202 B1 * | 9/2007 | Kawakami et al. | 380/283 |
| 7,343,327 B2 * | 3/2008 | Morita et al. | 705/27 |
| 2001/0021648 A1 * | 9/2001 | Fougnies et al. | 455/408 |
| 2002/0104019 A1 * | 8/2002 | Chatani et al. | 713/201 |
| 2002/0120667 A1 * | 8/2002 | Nakano | 709/200 |
| 2002/0165826 A1 * | 11/2002 | Yamamoto | 705/59 |
| 2003/0195851 A1 * | 10/2003 | Ong | 705/50 |
| 2004/0010470 A1 * | 1/2004 | Mills | 705/51 |
| 2007/0277247 A1 * | 11/2007 | Levy | 726/28 |

FOREIGN PATENT DOCUMENTS

| | | |
|---|---|---|
| JP | 08-263283 | 10/1996 |
| JP | 11-328033 | 11/1999 |
| JP | 2001-306528 | 11/2001 |
| JP | 2001-331600 | 11/2001 |
| JP | 2001-350862 | 12/2001 |
| JP | 2000-010777 | 1/2002 |
| JP | 2002-084274 | 3/2002 |
| JP | 2002-164879 | 6/2002 |
| JP | 2002-236768 | 8/2002 |
| JP | 2002-258962 | 9/2002 |
| JP | 2002-269375 | 9/2002 |
| WO | WO 02/30054 | 4/2002 |

* cited by examiner

FIG. 7

| NUMBER OF CLIENTS ALLOWED TO BE FURTHER REGISTERED | |
|---|---|
| INVALIDATION FLAG | CLIENT IDENTIFICATION INFORMATION #1 |
| INVALIDATION FLAG | CLIENT IDENTIFICATION INFORMATION #2 |
| INVALIDATION FLAG | CLIENT IDENTIFICATION INFORMATION #3 |
| ⋮ | ⋮ |
| INVALIDATION FLAG | CLIENT IDENTIFICATION INFORMATION #n |

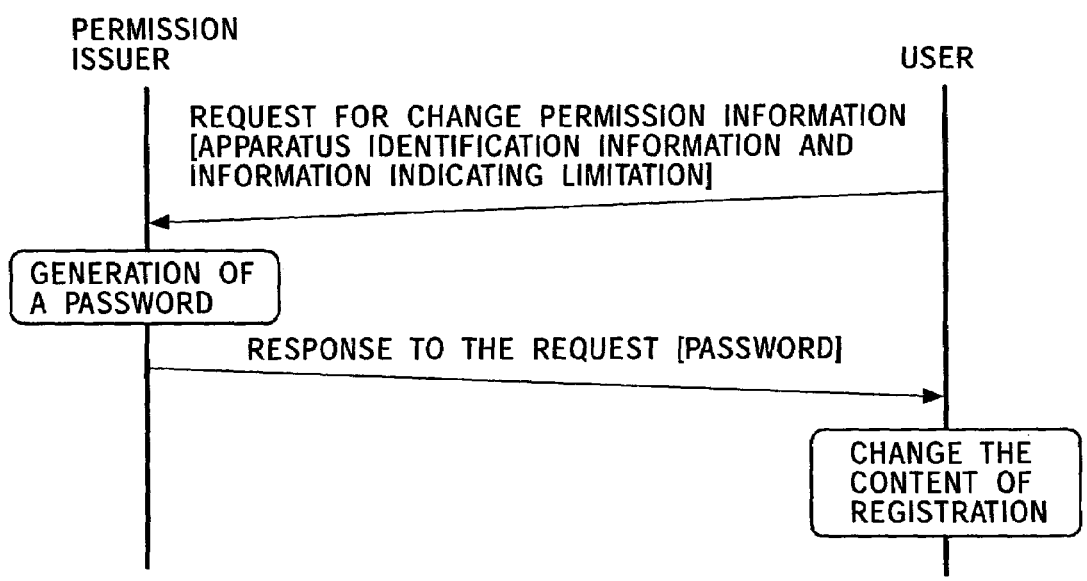

APPARATUS, METHOD AND COMPUTER PROGRAM FOR CONTROLLING USE OF A CONTENT

BACKGROUND OF THE INVENTION

1. Field of the Invention

The present invention relates to a method, an apparatus, and a computer program for controlling use of a content under a predetermined usage condition, and, in particular, to a method, apparatus, and a computer program for controlling use of a content provided to a user via a network or the like.

More particularly, the present invention relates to a method, an apparatus, and a computer program for controlling use of a content acquired via a network or the like under the control of a specific server manager, and, in particular, to a method, an apparatus, and a computer program for controlling use of a content managed by an end user so that the content is prevented from being illegally used.

2. Description of the Related Art

Nowadays, highly advanced technology is available in information processing, information communication, and computing, and computer systems are used in a wide variety of applications. There is an increasing need for network computing technology to connect computers to each other. In an environment in which computers are connected to each other via a network, computer resources can be shared by users and a job can be executed in a cooperative manner. Furthermore, information contents can be shared, distributed, and exchanged smoothly.

In recent years, widespread use of the Internet, advances in high-speed accessing technology such as broadband networking technology, and reduction in const have made it possible for many users to easily transmit various kinds of information contents over the world.

However, a problem of copyright protection has arisen, because distribution systems, such as Napster or Gnutell, have appeared which illegally copy and distribute copyrighted content data such as movie or music content data. Networks will be used in an increasingly wider scale and the performance thereof will be increasingly more enhanced. However, high values of such highly advanced networks will not be actually useful unless a mechanism of preventing contents from being illegally used will be established, because only limited information will be transmitted in an environment in which copyright is not protected. Furthermore, unauthorized use of contents will reduce motivation of writers or providers of contents, and related business will be greatly damaged.

In distribution of contents via a wide area network such as the Internet, in general, copyright is technically protected by distributing contents only when it is assured that the contents are used by authorized users or when charging for use of the contents has been performed.

In recent years, private networks such as a home network have become popular. Users are allowed to distribute contents within their home as long as the copyright of contents is not infringed. For example, a content acquired via BS digital broadcast may be distributed among information devices connected to each other via i-Link or the like. In such usage of contents, end users have to protect the contents. However, in such usage of contents, there is a possibility that contents are distributed to the outside of home without limitation.

To prevent such a possibility in a system in which contents such as a movie content or a music content purchased by a user are stored in a home server and viewed or listened to via the Internet, it is required to establish a mechanism of preventing the contents from being accessed for purposes departing from the private use.

However, at present, there is no standard copyright protection system widely accepted by copyright holders. In the USA, because of lack of consensus on protection of copyright of contents, there are lawsuits for broadcast recording apparatuses having the capability of transmitting contents via the Internet.

One known technique of preventing contents from being used illegally in departure from personal use is to limit the number of devices which can receive service. Another known technique is to limit access of contents such that only those clients whose identification information (such as a MAC address) has already been registered are allowed to access contents. However, those techniques are effective if server managers correctly perform settings and if server manages do not intentionally make setting such that illegal access becomes possible. From the viewpoint of content copyright holders, even in a case in which contents are managed by a server manager, in particular, by an end user of a home server or the like, it is necessary to prevent contents from being illegally distributed. However, at present, there are no standard protection mechanisms or systems which satisfy the above requirement.

SUMMARY OF THE INVENTION

An object of the present invention is to provide a method, an apparatus, and a computer program for controlling use of a content acquired via a network or the like, under the management of a particular server manager.

It is another object of the present invention to provide a method, an apparatus, and a computer program for controlling use of a content managed by an end user so that the content is prevented from being illegally used.

It is another object of the present invention to provide a method, an apparatus, and a computer program for controlling use of a content managed by an end user of a home network or the like so that the content is prevented from being freely distributed or provided against a predetermined usage condition.

According to a first aspect of the present invention, in view of the above, there is provided a content usage control method/apparatus for controlling use of a content under a predetermined condition, comprising acquisition step/means for acquiring identification information of an apparatus or user requesting use of a content, registration step/means for registering the identification information acquired from the other apparatus or user, and usage control step/means for, in response to the request for use of the content issued by the other apparatus or user, determining whether the use of the content is allowed on the basis of whether the identification information of the other apparatus or user is already registered.

For example, the present invention is useful to control an apparatus capable of outputting fee-charging contents such as movie contents or music contents such that contents are provided to only limited authorized users thereby preventing the contents from being illegally used by unauthorized users. In the content usage control method/apparatus for controlling use of a content, identification information of authorized apparatuses or users is first registered before starting provision of contents thereto, thereby preventing the contents from being used by unauthorized apparatus or users whose identification information is not registered.

In the registration step/means, registration may be performed in response to a request issued by the apparatus or user.

In the registration step/means, an invalidation flag for controlling provision of a service to a client whose identification information is already registered may be stored together with identification information of the apparatus or user, and in the usage limiting step/means, the use of the content by the other apparatus or user may be limited, if the invalidation flag associated with the other apparatus or the user is set.

In the registration step/means, an invalidation flag for controlling provision of a service to a client whose identification information is already registered may be stored together with identification information of another apparatus or user, and in the usage limiting step/means, the use of the content by the other apparatus or user may be limited, if the invalidation flag associated with the other apparatus or the user is set.

The content usage control method/apparatus according to the first aspect may further comprise change limiting step/ means for limiting changing, performed in/by the registration step/means, of registered information.

If it is allowed to change, without any limit, the content of registration described in the registration information database, there is a possibility that contents are distributed or provided to the outside of home (against copyright protection). In the content usage control method/apparatus according to the present invention, to avoid the above problem, limitation is imposed on rewriting of identification information registered in the registration information database. That is, identification information of an apparatus or a user having permission to receive a service is allowed to be replaced with identification information of a different apparatus or another user within a predetermined limitation.

Even if a user of the content usage control apparatus intentionally attempts to register an unauthorized apparatus or user, the limitation imposed on changing of registration prevents the contents from being illegally used with no limit.

If an external apparatus or an external user is registered, the result is to obstruct internal users such as family members or the like in using the contents. Thus, the limitation on changing of registration suppresses unauthorized registration.

By limiting usage of contents in the above-described manner, it becomes possible to prevent contents from being illegally used and thus it becomes possible to protect contents in the manner desired by content providers. This makes it possible to provide a wide variety of services and contents.

In the change limiting step/means, the number of times already registered identification information is replaced with identification information of a different apparatus or user may be limited to a predetermined value. If replacement is performed the predetermined number of times, no further replacement is allowed. The data indicating the allowable number of times rewriting of registration information is performed may be protected so that the data cannot be tampered with by an end user.

In the change limiting step/means, the frequency at which already registered identification information is replaced with identification information of a different apparatus or user may be limited. For example, if registration information is changed, further changing of registration information is inhibited until a predetermined period of time elapses. Alternatively, the maximum allowable number of times registration information is changed within a predetermined period of time may be limited to a particular value.

The change limiting step/means may include, when already registered identification information is replaced with identification information of a different apparatus or user, requesting the other apparatus or user to perform a particular operation. For example, inputting of a password or pressing of a particular button (for example, pressing a plurality of buttons in a predetermined order) is requested.

The change limiting step/means may include, when already registered identification information is replaced, requesting submission of change permission information from a different apparatus or a manager. For example, a password or a key data is acquired via a telephone, the Internet, a postal mail, or a storage medium or via voice, and changing of limitation is enabled when it is directly or indirectly determined that permission is granted.

The change limiting step/means may include charging depending on the maximum allowable number of times already registered identification information is changed.

The change limiting step/means may include, when the limitation on registration is changed, requesting submission of change permission information from a different or a particular manager. For example, a password or a key data is acquired via a telephone, the Internet, a postal mail, or a storage medium or via voice, and changing of limitation is enabled when it is directly or indirectly determined that permission is granted.

By allowing the limitation imposed on the rewriting of registration information to be changed, it becomes possible to provide an option which allows an end user to use contents within a lower-level limitation, while allowing the holder of copyright of contents to control the use of the contents.

According to a second aspect of the present invention, there is provided a computer program described in a computer-readable format, for causing a computer system to execute a process of controlling use of a content under a predetermined condition, the process comprising the steps of acquiring identification information of an apparatus or user requesting use of a content, registering the identification information acquired from the other apparatus or the user, and in response to the request for use of the content issued by the other apparatus or the user, determining whether the use of the content is allowed on the basis of whether the identification information of the other apparatus or the user is already registered.

The computer program according to the second aspect of the present invention is a computer program described in the computer-readable format for causing a computer system to execute a particular process. That is, by installing the computer program according to the second aspect of the present invention into a computer system, it becomes possible to achieve a cooperative operation on the computer system thereby achieving functions similar to those achieved by the method/apparatus for controlling use of contents according to the first aspect.

These and other objects and features of the present invention will become more apparent from the following detailed description of embodiments with reference to the accompanying drawings.

BRIEF DESCRIPTION OF THE DRAWINGS

FIG. 7 is a diagram showing an example of a format of a registration information database stored in the content usage control apparatus;

FIG. 16 is a diagram showing a sequence in which a user of the content usage control apparatus requests an issuer of permission information to provide a password needed to change the limitation on registration;

FIG. 17 is a diagram showing an example of a format of a password; and

DESCRIPTION OF THE PREFERRED EMBODIMENTS

Embodiments of the present invention are described in detail below with reference to the accompanying drawings.

Figure 1:
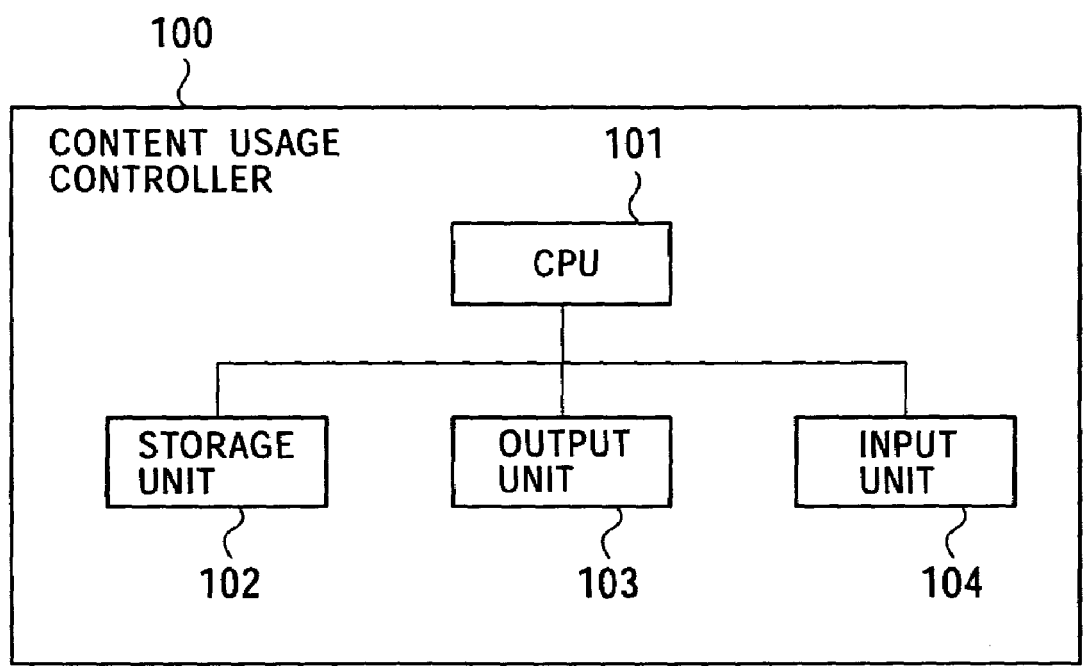
FIG. 1 is a diagram schematically showing a basic construction of a content usage control apparatus according to an embodiment of the present invention.

FIG. 1 is a diagram schematically showing a basic construction of a content usage control apparatus 100 according to an embodiment of the present invention.

The content usage control apparatus 100 operates under the control of a CPU (Central Processing Unit) 101 serving as a main controller. That is, the content usage control apparatus 100 is operated by the CPU 101 by executing particular program code in a program execution environment provided by an operating system (OS). The CPU 101 is connected to other devices via a bus.

In the present embodiment, the CPU 101 executes a content usage control program whereby, for example, provision (transmission or distribution) of contents under a predetermined usage condition is controlled, and/or registration or change of registration of a client to which to provide contents is controlled.

A storage unit 102 includes a semiconductor memory such as a RAM (Random Access Memory) or a ROM (Read Only Memory) and/or an external storage device such as a hard disk drive or a CD/DVD read/write drive.

The RAM is used to store a program code executed by the CPU 101 and to temporarily store work data processed during execution of the program code. In the present embodiment, the content usage control program is loaded in the RAM, and provision (transmission or distribution) of contents under the predetermined usage condition is controlled, and/or registration or change of registration of a client to which to provide contents is controlled by executing the content usage control program.

The ROM is a semiconductor memory for permanently store data. For example, a POST (Power On Self Test) program code and a BIOS (Basic Input/Output System) program code for controlling input/output of data to/from hardware are stored in the ROM.

The hard disk drive is an external storage device including a fixed magnetic disk serving as a storage medium (as is well known). The hard disk drive is superior to other types of external storage devices in terms of storage capacity and data transfer speed. Loading a software program in an executable manner in the hard disk drive is called "installing". In general, the program code of the operating system, the application program, and device drivers, executed by the CPU 101, are stored in a nonvolatile manner on the hard disk drive. For example, the content usage control program is installed on the hard disk drive, and provision (transmission or distribution) of contents under the predetermined usage condition is controlled, and/or registration or change of registration of a client to which to provide contents is controlled by executing the content usage control program. Contents to be provided may also be stored on the hard disk drive. Furthermore, information associated with clients to which to provide the contents may also be stored on the hard disk drive so that the content usage control program can register clients and can change registration.

The CD/DVD read/write drive is used to access data recording surface of a removable storage medium such as a CD-ROM disk, a CD-R disk, or a DVD disk mounted thereon. The removable storage medium is mainly used to store backup data of a software program or a data file in a computer readable format or to transfer such a software program or a data file between systems (for the purpose of selling, distributing or providing the software program or the data file). For example, the removable storage medium can be used to physically deliver or distribute the content usage control program for controlling provision (transmission or distribution) of contents under a predetermined usage condition and/or for controlling registration or change of registration of a client to which to provide contents. The removable storage medium may also be used to exchange, with an apparatus, contents to be provided and/or information associated with clients to which to provide the contents, wherein registration of clients and changing of registration of clients are performed by the content usage control program.

An output unit 103 includes a user output device (not shown) such as a display, a speaker, and/or a printer and a communication interface for transmitting information such as content data to an apparatus. The output unit 103 is used to provide a particular service such as provision of a content to an apparatus (client) or a user. The output unit 103 may be used to also display information indicating that a request for registration of an apparatus or user to which to provide contents or a request for provision of a particular service cannot be accepted, if the request should be rejected.

An input unit 104 is used to receive a registration request or a request for provision of a particular service issued by an apparatus (client) or a user. The input unit 104 is also used to acquire identification information of the apparatus or user. An operation of changing registration or changing limitation on registration is also performed via the input unit 104. The input unit 104 includes a communication interface, a user input device (not shown) such as a keyboard or a mouse, a switch, a sensor, and/or a camera, for receiving a user request or identification information.

The communication interface may be used to download, into the apparatus 100, the content usage control program for controlling provision (transmission or distribution) of contents under a predetermined usage condition and/or for controlling registration or change of registration of a client to which to provide contents. The communication interface may also be used to exchange, with an apparatus, information associated with clients to which to provide the contents, wherein registration of clients and changing of registration of clients are performed by the content usage control program.

A specific example of the content usage control apparatus 100 shown in FIG. 1 is a personal computer compatible with the IBM PCIAT (Personal Computer/Advanced Technology) or a personal computer of a graded-up version thereof. As a matter of course, a computer based on another architecture may also be used as the content usage control apparatus 100 according to the present embodiment. Another specific example of the content usage control apparatus 100 is a broadcast receiver having a hard disk drive. In this case, the content usage control apparatus 100 itself has the capability of storing a content and supplying the content to an apparatus or user.

When an apparatus or user wants to receive a particular service from the content usage control apparatus 100, the other apparatus or user first requests the apparatus 100 to register identification information of the other apparatus or the user. In response to receiving the request, the content usage control apparatus 100 determines whether the identification information can be registered without contravening the rule about the maximum allowable number of registrations or the maximum allowable number of times registration is changed. If it is determined that the identification information is allowed to be registered, the content usage control apparatus 100 registers the identification information. By limiting the maximum allowable number of registrations or the maximum allowable number of times registration is changed, it becomes possible to prevent user registration from being freely performed or changed, thereby preventing contents from being illegally distributed.

Figure 2:
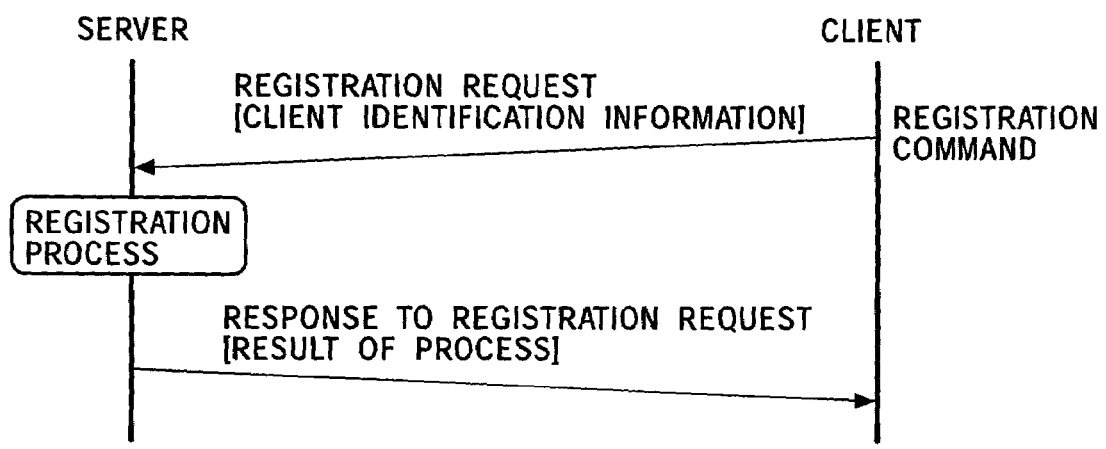
FIG. 2 is a diagram showing a registration process sequence in which the content usage control apparatus (server) performs registration in response to a request from an apparatus or user (client)

FIG. 2 shows a registration process sequence in which the content usage control apparatus (server) 100 performs registration in response to a request from an apparatus or user (client).

At the beginning of the registration process sequence, a client transmits a registration request together with identification information of the client to the server. In response to receiving the registration request, the server performs the registration process and transmits response information indicating the result of the registration process to the client.

Figure 3:
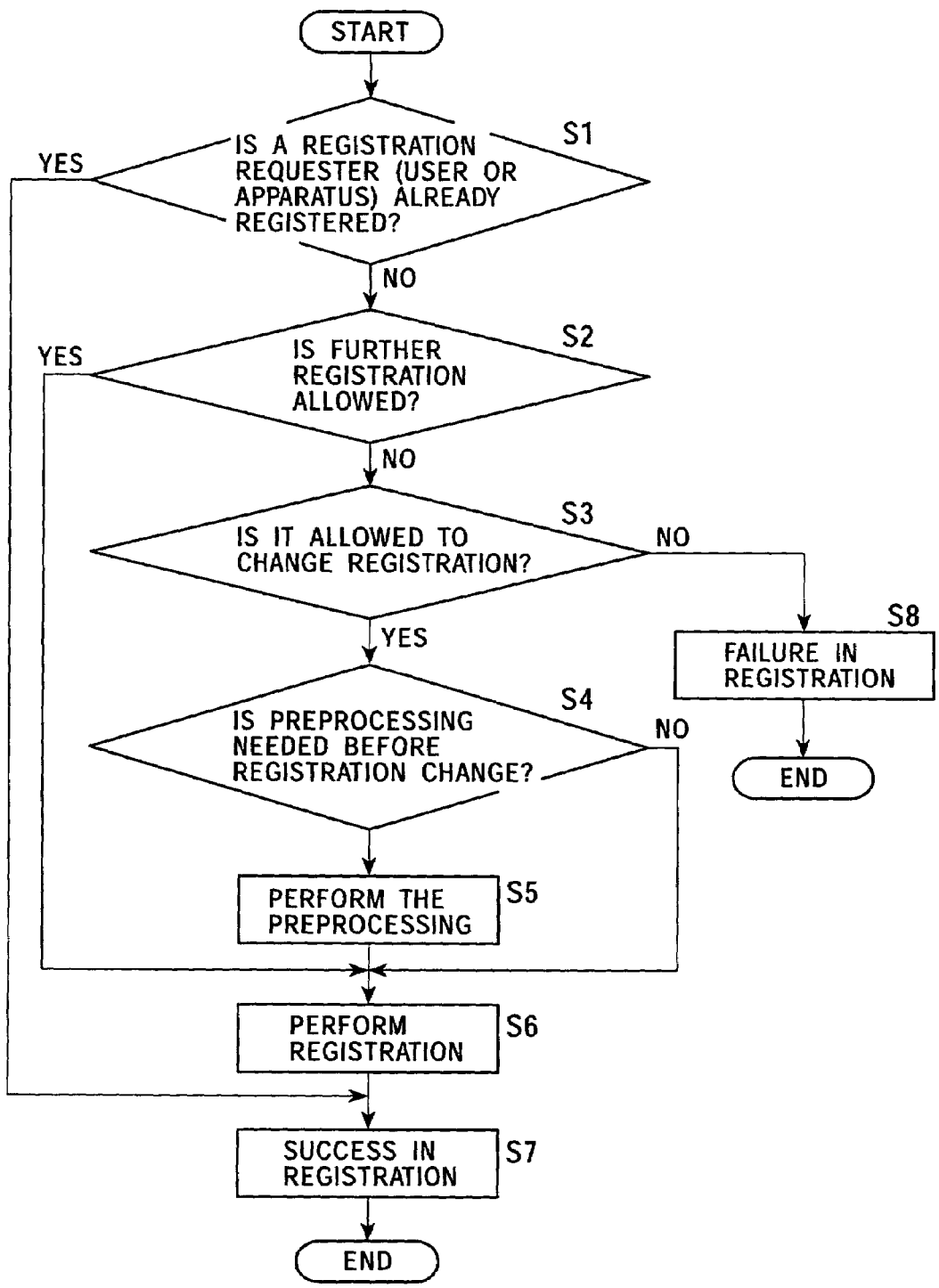
FIG. 3 is a flow chart showing a registration procedure performed on the content usage control apparatus.

FIG. 3 shows, in the form of a flow chart, a registration procedure performed on the content usage control apparatus 100. In practice, this registration procedure is performed by the CPU 101 by executing a program code.

First, it is determined whether a client requesting registration has already been registered (step S1). If the client has already been registered, further registration is not necessary, and thus the process is successfully ended.

On the other hand, if it is determined that the client is not registered yet, the maximum number of registrations allowed for the content usage control apparatus 100 is checked to determine whether a further registration is allowed (step S2). If it is determined that a further registration is allowed, the client is registered and the process is successfully ended.

However, if it is determined that no further registration is allowed, the maximum allowable number of times the content usage control apparatus 100 is allowed to change registration is checked to determine whether an existing registration is allowed to be replaced to register the client (step S3). If no further change is allowed, the process is unsuccessfully ended (step S8).

In a case in which it is determined that registration replacement is allowed, it is further determined whether preprocessing is needed before registration replacement (step S4). If preprocessing is not needed, replacement of registration is directly performed (S6). If preprocessing is needed, the preprocessing is performed (step S5), and then replacement of registration is performed (step S6). Thereafter, the present routine is successfully ended.

When an apparatus or user wants to receive a particular service from the content usage control apparatus 100, the other apparatus or the user issues a request for the service to the apparatus 100. In response, the content usage control apparatus 100 determines whether the identification information of the apparatus or the user requesting the provision of the content is already registered. If it is determined that the identification information is registered, the content usage control apparatus 100 provides the requested service. However, the identification information is not registered, the service is not provided.

Figure 4:
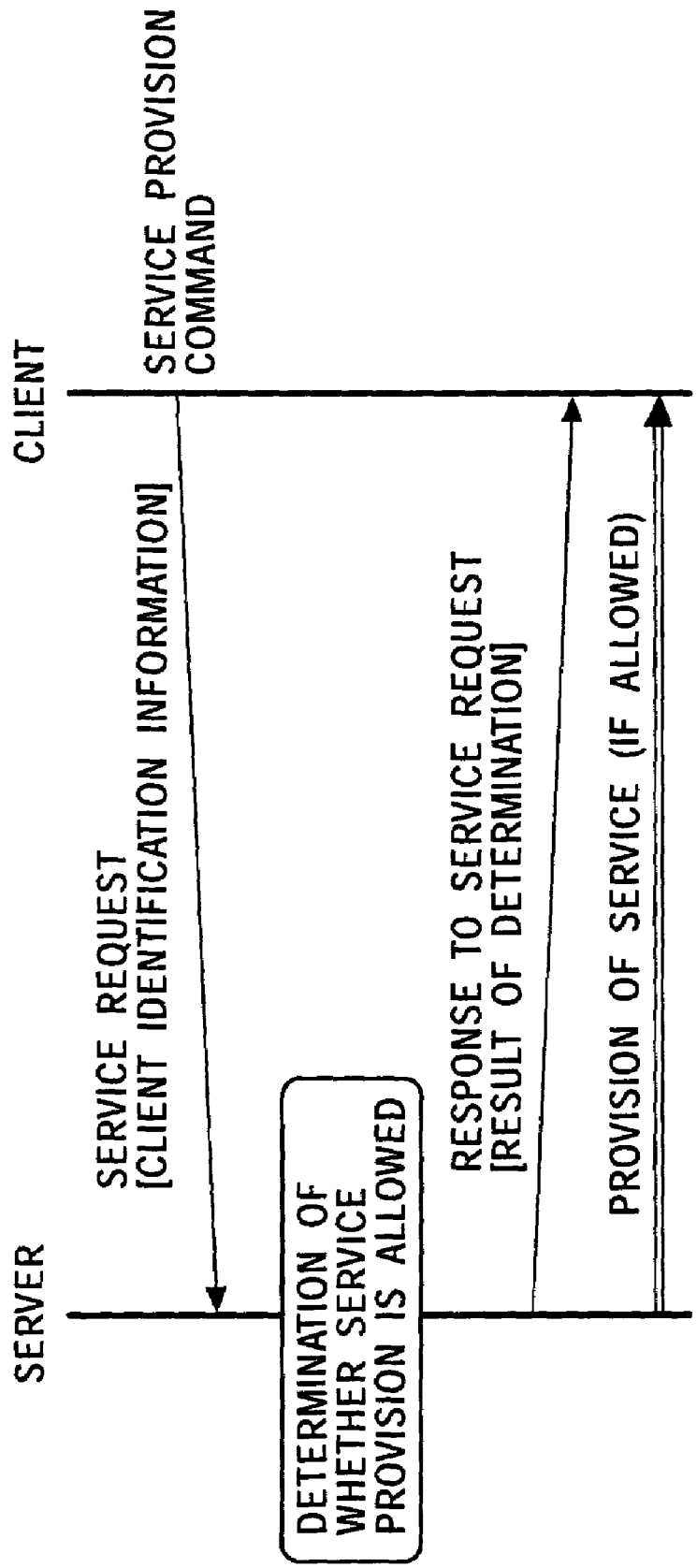
FIG. 4 is a diagram showing an operation sequence in which an apparatus or user (client) issues a request for service to the content usage control apparatus serving as a server.

FIG. 4 shows an operation sequence in which an apparatus or user (client) issues a request for service to the content usage control apparatus 100 serving as a server.

When a client wants to receive a service, the client transmits a service request together with identification information of the client to the server. In response to receiving the request, the server performs a process of determining whether service provision is allowed and returns a response indicating the result of the determination to the client. If it is determined that provision of service is allowed, the server provides the requested service to the client.

Figure 5:
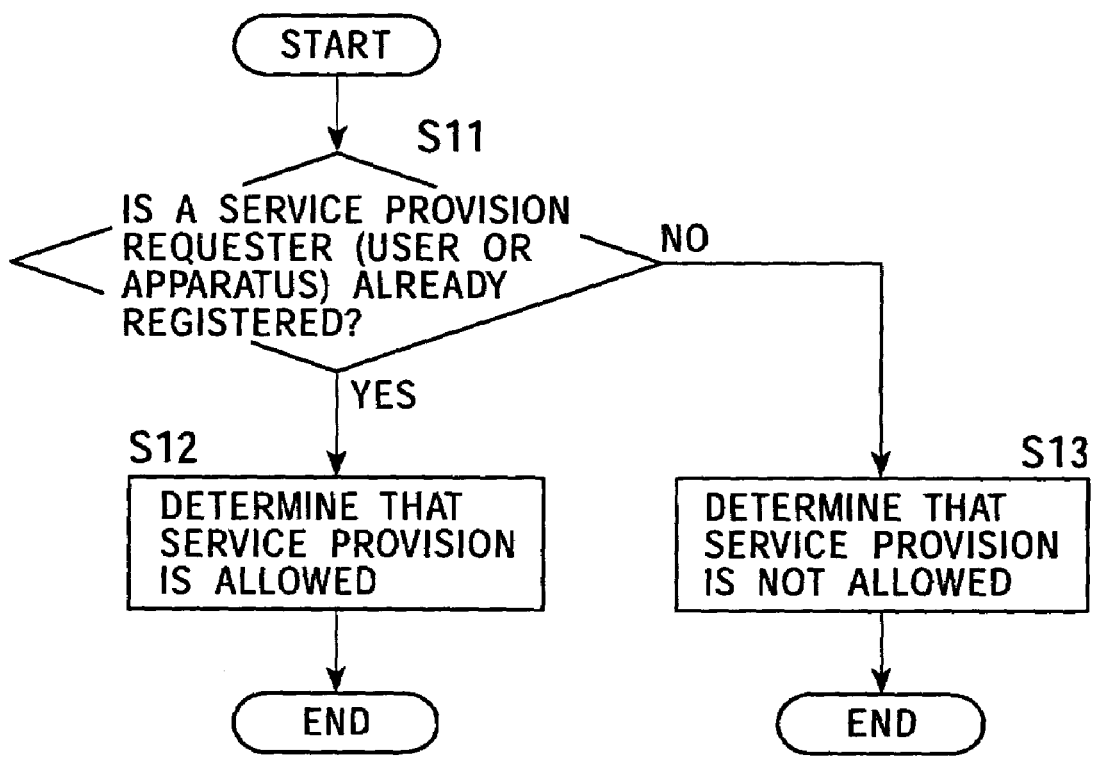
FIG. 5 is a flow chart showing a process performed by the content usage control apparatus to determine whether to allow service provision, before providing a service.

FIG. 5 shows, in the form of a flow chart, the process of determining whether to allow service provision, performed by the content usage control apparatus 100 before providing a service. In practice, this procedure is performed by the CPU 101 by executing a program code.

First, it is determined whether the identification information received from the issuer of the service request is already registered (step S11).

If the identification information is already registered, it is determined that provision of the service is allowed (step S12), and the process is successfully ended. However, if the identification information is not registered, it is determined that provision of the service is not allowed (step S13), and the process is unsuccessfully ended.

Figure 6:
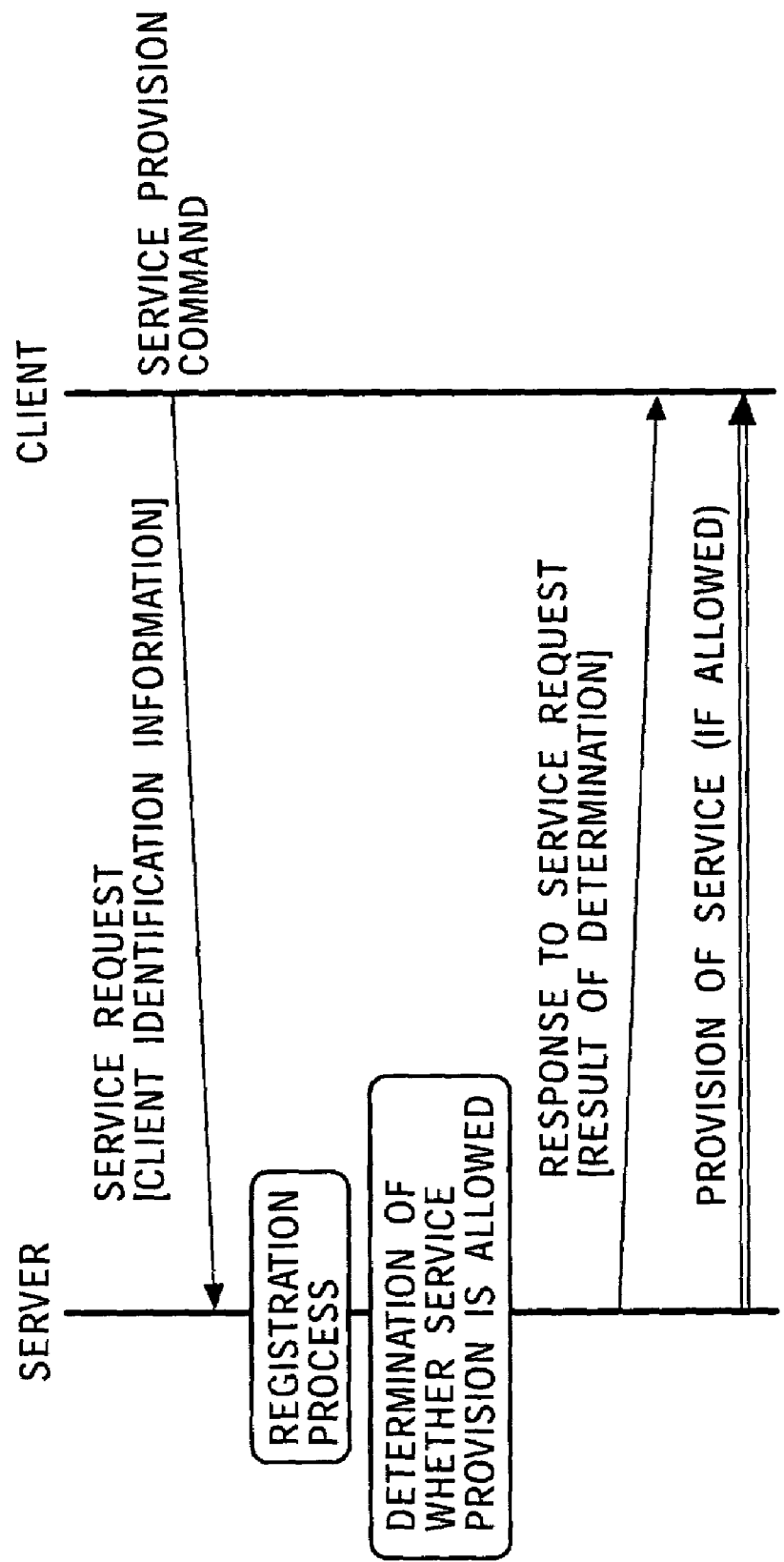
FIG. 6 is a diagram showing a service request sequence in which processing including client registration is performed.

FIG. 6 shows a service request sequence in which processing including client registration is performed without performing preprocessing corresponding to the registration sequence described above with reference to FIGS. 2 and 3.

When a client wants to receive a service, the client transmits a service request together with identification information of the client to the server.

In response to receiving the request, the server performs a registration process and further performs a process of determining whether to allow service provision. The server returns a response indicating the result of the determination to the client. If it is determined that provision of service is allowed, the server provides the requested service to the client.

The registration process and the process of determining whether to allow service provision, performed by the server, are similar to those described above with reference to the flow charts shown in FIGS. 3 and 5, and thus they are not described in further detail herein.

FIG. 7 shows an example of a format of a registration information database stored in the content usage control apparatus 100 serving as the server.

In a field of "the number of clients allowed to be further registered", the value indicating the number of identification information of clients allowed to be further registered is described. In the case in which the maximum allowable number of registrations is n, n is stored as an initial value in this field. Each time a client is registered, the value is decremented by 1. If n clients are registered, the value becomes equal to 0. When it is determined, in step S2 in the flow chart shown in FIG. 3, whether a further registration of a client is allowed, the determination is made depending on whether the above-described value is equal to 0. This value is not changed when an existing registration of a client is replaced with a registration of another client.

In a field of "client identification information", registered identification information of a client is described. When it is determined, in step S1 in the flow chart shown in FIG. 3 or in step S11 in the flow chart shown in FIG. 5, whether a client is already registered, the information described in this database is checked, and the determination is made depending on whether identification information received from an issuer of registration request or a service request is found in the database. In the registration process shown in FIG. 3, when a client is newly registered, identification information of the client is described in a vacant field, while, when registration is changed, new identification information is overwritten in a field in which identification information of another client is already registered.

In a field of "invalidation flag", information is described to indicate whether service is allowed to be provided to a client whose identification information is already registered. For example, the flag is set to 0 when service provision is not allowed, and the flag is set to 1 when service provision is allowed.

If it is allowed to change, with no limit, the content of registration described in the registration information database, there is a possibility that contents are distributed or provided to the outside of home (against copyright protection). In the content usage control apparatus 100 according to the present embodiment, to avoid the above problem, limitation is imposed on rewriting of identification information registered in the registration information database. That is, an apparatus or user having permission to receive a service is allowed to be replaced with a different apparatus or user only within a predetermined limit. Specific examples of methods of limiting rewriting of identification information are described below.

EXAMPLE 1

The number of times registered identification information is replaced with identification information of a different apparatus or user is limited to a predetermined value. If replacement is performed the predetermined number of times, no further replacement is allowed.

A value, indicating the maximum allowable number of times replacement of identification information is performed, is predetermined, and the predetermined value is stored in a nonvolatile rewritable memory (NVRM, EEPROM, or HDD) such as the storage unit 102. When it is determined, in step S3 of the flow chart shown in FIG. 3, whether replacement of identification information is allowed, the value stored in the memory is checked, and the determination is made depending on the value.

Figure 8:
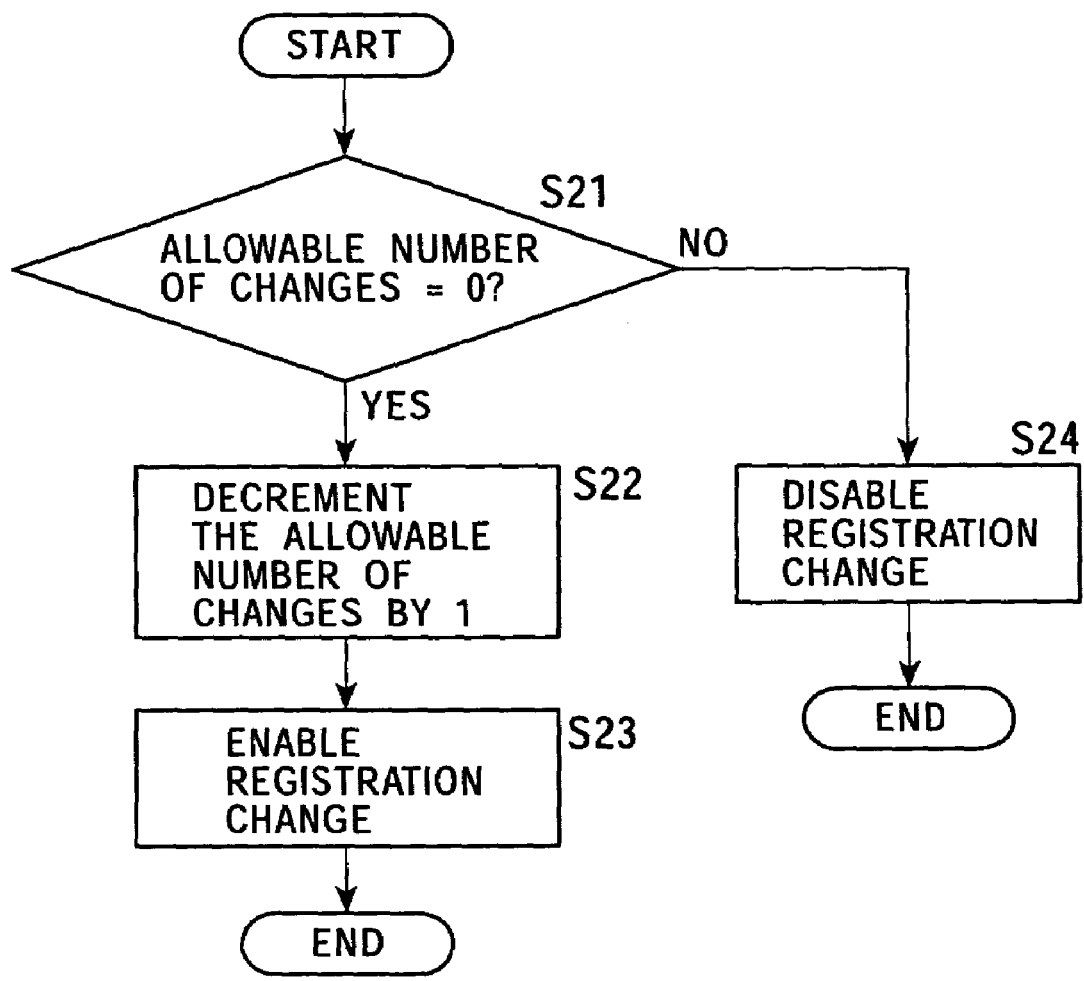
FIG. 8 is a flow chart showing a process of determining whether rewriting of registration information is allowed.

FIG. 8 shows, in the form of a flow chart, the process of determining whether rewriting of registration information is allowed. In practice, this process is performed by the CPU 101 by executing a program code.

First, if client identification information is received from an issuer of a request, an entry corresponding to the client of the registration information database is checked to determine whether the value indicating the number of times rewriting of registration information is allowed to be further performed is equal to 0 (step S21).

If the value indicating the number of times rewriting of registration information is allowed to be further performed is not equal to 0, the value is decremented by 1 (step S22), and the registration information is rewritten in accordance with the request (step S23). The process is then successfully ended.

On the other hand, if the value indicating the number of times rewriting of registration information is allowed to be further performed is equal to 0, the requested rewriting of registration information is not performed (step S24), and the process is unsuccessfully ended.

The data indicating the allowable number of times rewriting of registration information is performed is protected so that the data cannot be tampered with by an end user. For example, by using hardware, such as the CPU 101 including the built-in storage unit 102, capable of preventing tampering, a program of a process shown in FIG. 8 and data indicating the allowable number of times rewriting of registration information is performed are stored in the CPU 101 in such a manner that the data is physically protected from being rewritten from the outside of the chip.

EXAMPLE 2

A limit is imposed on the frequency at which identification information is replaced with identification information of a different apparatus or user.

Figure 9:
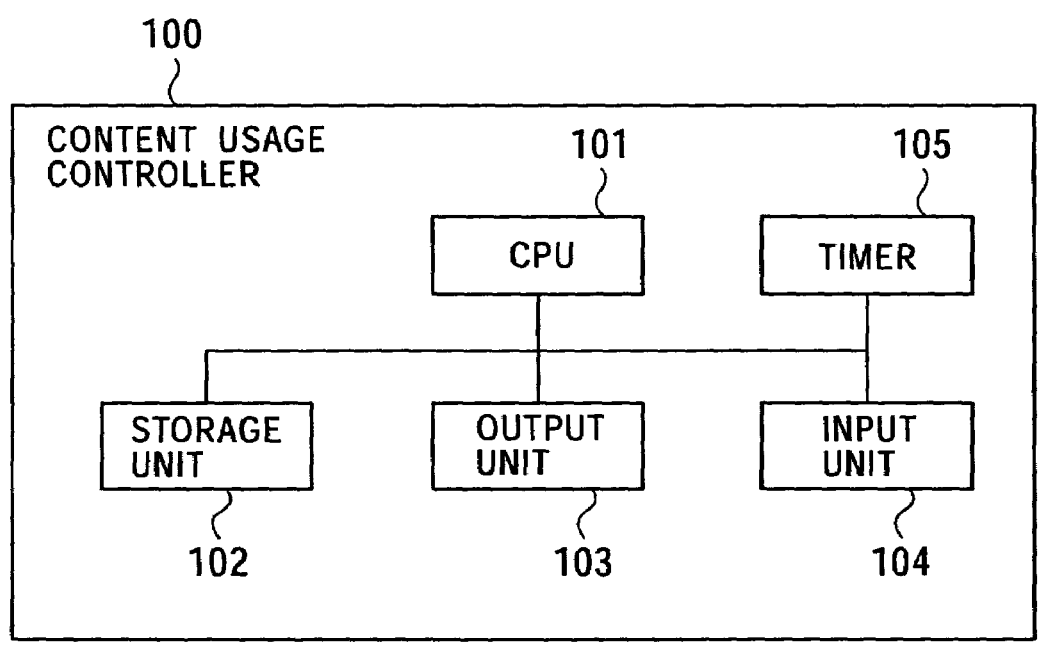
FIG. 9 is a schematic diagram of a content usage control apparatus modified so as to have the capability of limiting the frequency at which registered identification information is replaced with identification information of a different apparatus or user.

FIG. 9 shows a content usage control apparatus 100 modified so as to have the capability of limiting the frequency at which registered identification information is replaced with identification information of a different apparatus or user. As shown in FIG. 9, the content usage control apparatus 100 is similar to that shown in F*ig*. 1 except that it additionally includes a timer 105 for counting the elapse of time. Alternatively, instead of including the timer 105, the content usage control apparatus 100 may include a mechanism of acquiring time information from a different apparatus (not shown) via the input unit 104.

Figure 10:
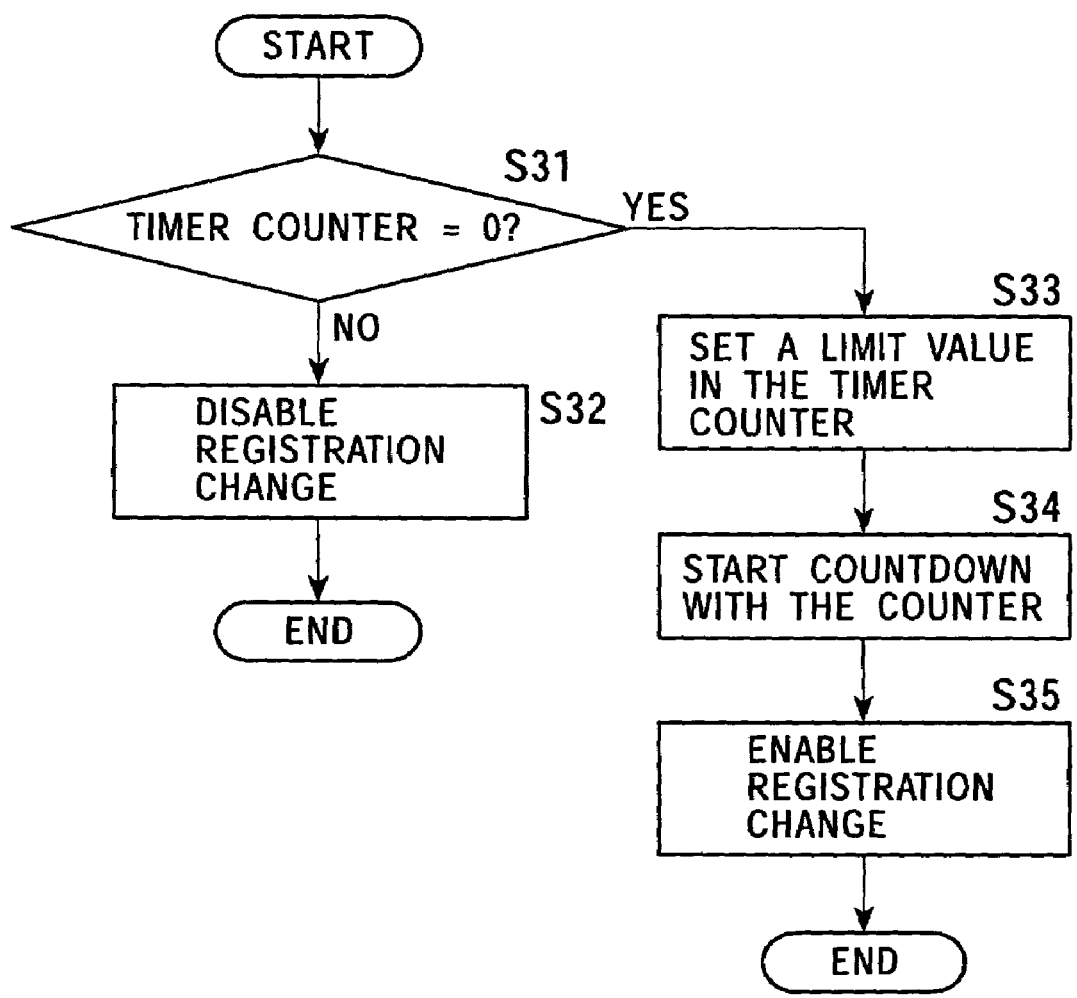
FIG. 10 is a flow chart showing a process of imposing a limitation on the process, shown in FIG. 3, of determining whether registration is allowed, such that changing of registration is allowed only once within a predetermined period of time.

FIG. 10 shows, in the form of a flow chart, a process of imposing a limitation on the process, shown in FIG. 3, of determining whether registration is allowed, such that changing of registration is allowed only once within a predetermined period of time. In practice, this process is performed by the CPU 101 by executing a program code.

The predetermined period of time is determined by a value set in the timer and intervals at which the timer value is down counted. The timer value is initially set to 0.

First, it is determined whether the timer value has reached 0 (step S31).

If the timer value has not yet reached 0, rewriting of registration information is disabled (step S32), and the present routine is unsuccessfully ended.

In the case in which the timer value has reached 0, the timer is set to the value indicating the period during which rewriting of registration is not allowed (step S33), and countdown of the timer is started (step S34). Thereafter, rewriting of registration information is enabled (step S35), and the present routine is successfully ended.

The counter value in the timer operation is prevented from being tampered with. This can be achieved by using a CPU 101 including a built-in timer. Alternatively, the timer value may be periodically read and stored in a register in the CPU 101, and if the read value is greater than the previously stored value, the timer value is reset to the stored value.

When rewriting of registration information is cancelled, the initialization of the timer may not be performed. In this case, the timer value may be initialized when rewriting of registration information is performed for the first time after the last canceling of rewriting of registration information.

Figure 11:
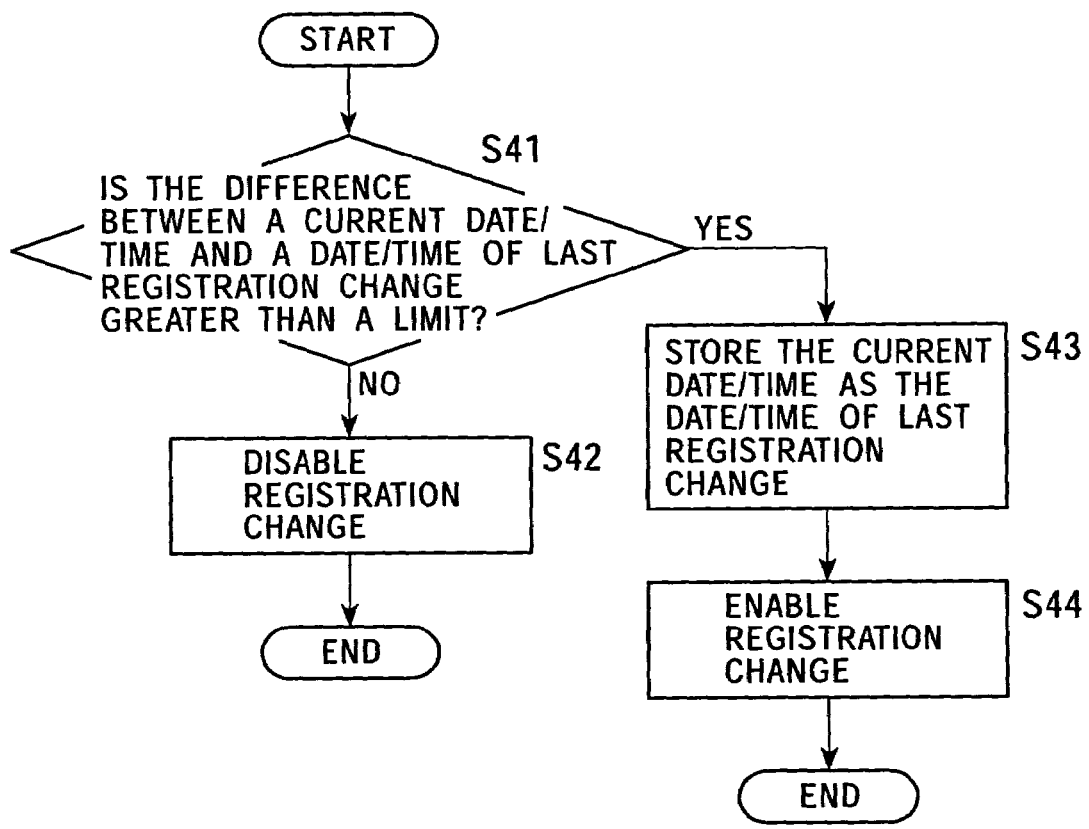
FIG. 11 is a flow chart showing a process of limiting the number of times registration information is rewritten within a predetermined period of time, on the basis of information indicating the present date/time.

FIG. 11 shows, in the form of a flow chart, a process of limiting the number of times registration information is rewritten within a predetermined period of time, by using the present date/time instead of using the timer shown in FIGS. 9 or 10. In practice, this process is performed by the CPU 101 by executing a program code.

First, it is determined whether the interval from a date/time of last rewriting of registration information to the current date/time is greater than the predetermined value (step S41).

If the interval from the date/time of last rewriting to the current date/time is smaller than the predetermined value, rewriting of registration information is disabled (step 42), and the present routine is unsuccessfully ended.

On the other hand, if the interval from the date/time of last rewriting to the current date/time is greater than the predetermined value, the date/time of last rewriting is replaced with the current date/time (step S43), and rewriting of registration information is enabled (step S44). Thereafter, the present routine is successfully ended.

In a case in which the current date/time is acquired from an external device, data indicating the current date/time is encrypted using a common encryption key, or a digital signature based on public key encryption is attached to the data, in order to prevent data indicating the current date/time from being tampered with.

EXAMPLE 4

When rewriting of registered identification information is performed, a particular operation is requested. For example, inputting of a password or pressing of particular buttons (for example, pressing a plurality of buttons in a predetermined order) is requested.

Figure 12:
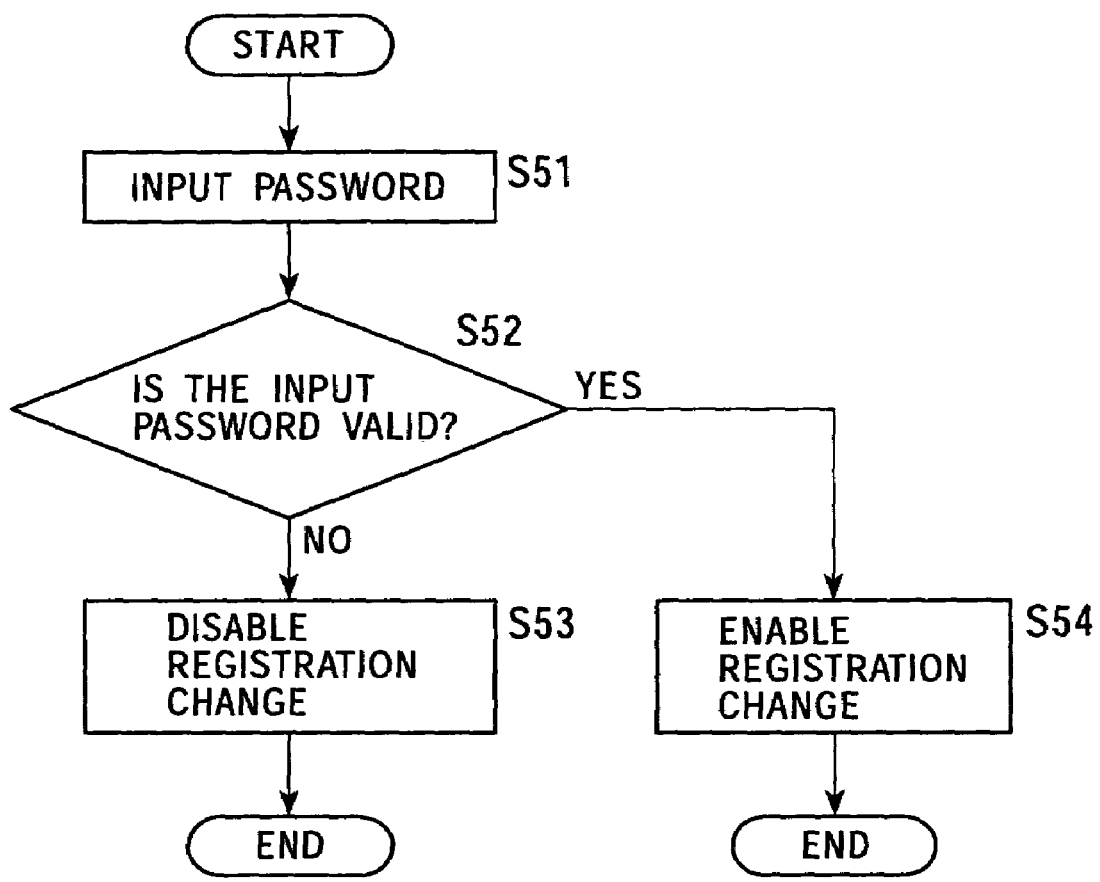
FIG. 12 is a flow chart showing a process of requesting inputting of a password in the process, shown in FIG. 3, of determining whether registration is allowed.

FIG. 12 shows, in the form of a flow chart, a process of requesting inputting of a password in the process, shown in FIG. 3, of determining whether registration is allowed. In practice, this process procedure is performed by the CPU 101 by executing a program code.

First, a password is input via the input unit 104 (step S51). The input password is then checked to determine whether the password is valid (step S52).

If the password is not valid, rewriting of registration information is disabled (step S52) and the present routine is unsuccessfully ended.

On the other hand, if the password is valid, rewriting of registration information is enabled (step S53), and the present routine is successfully ended.

Data indicating valid passwords is stored in advance in the storage unit 102. The inputting of the password may be performed by pressing particular buttons.

EXAMPLE 5

When registered identification information is rewritten, it is required to acquire permission to rewrite the identification information from an external device or a manager. For example, a password or a key data is acquired via a telephone, the Internet, a postal mail, or a storage medium or via voice, and rewriting of registration information is enabled when it is directly or indirectly determined that permission is granted.

Figures 13, 14:
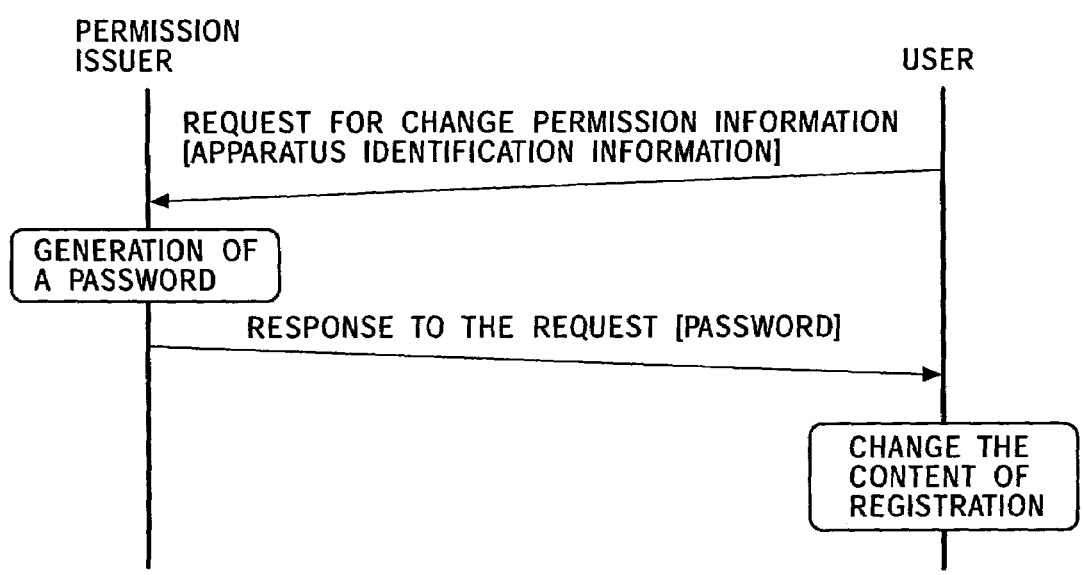
FIG. 13 is a diagram showing a sequence in which a user of the content usage control apparatus requests an issuer of permission information to provide a password needed to rewrite registration information.
FIG. 14 is a diagram showing an example of a format of a password.

FIG. 13 shows a sequence in which a user of the content usage control apparatus 100 requests an issuer of rewrite permission information to provide a password needed to rewrite registration information.

The user transmits a request for a password together with unique device identification information (for example, inscribed on the device) to the issuer of rewrite permission information. In response, the issuer creates a password on the basis of the received apparatus identification information and a password serial number managed by the issuer.

FIG. 14 shows an example of a format of a password. In the example shown in FIG. 14, the password includes apparatus identification information, a password serial number, and digital signature data. The digital signature data may be produced using a public key encryption technique on the basis of the apparatus identification information and the password serial number.

If the user receives the password, the user inputs the received password into the device and performs an operation to rewrite registration information. The content usage control apparatus 100 performs the process shown in FIG. 12 to determine whether rewriting of registration information is allowed.

Figure 15:
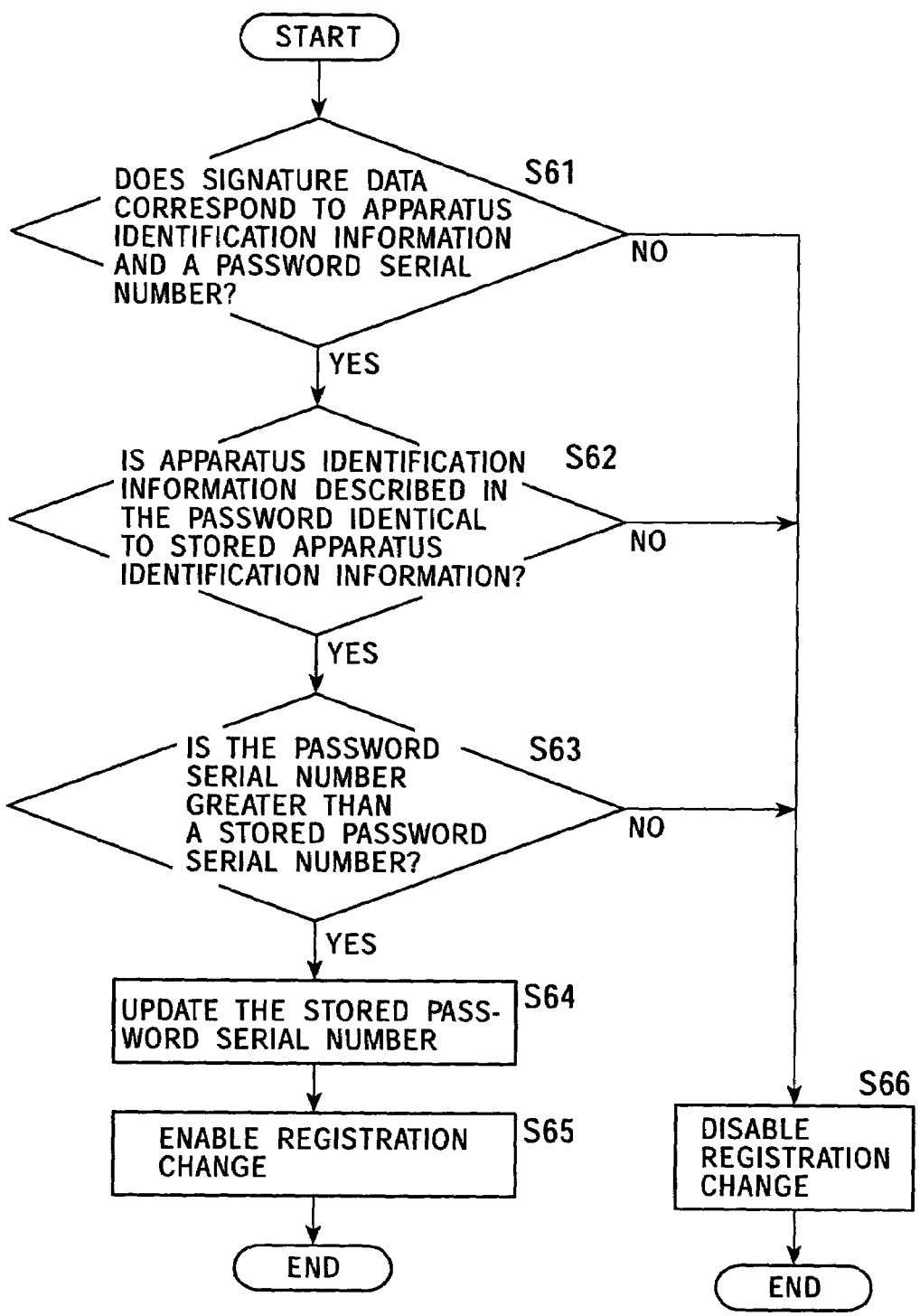
FIG. 15 is a flow chart showing a process of determining whether a password is valid.

FIG. 15 shows, in the form of a flow chart, a process of determining whether a password produced in the above-described manner is valid. Herein it is assumed that the content usage control apparatus 100 has, in the storage unit 102, information (such as a public key of the issuer of permission) necessary in verification of digital signature data and apparatus identification information. It is also assumed that the password serial number is initially set to 0.

First, it is determined whether the digital signature data is consistent with the apparatus identification information and the password serial number (step S61). If the determination is negative, rewriting of registration information is not permitted (step S66), and the present routine is unsuccessfully ended.

Thereafter, it is determined whether the apparatus identification information included in the password is identical to the corresponding stored apparatus identification information (step S62). If the determination is negative, rewriting of registration information is not permitted (step S66), and the present routine is unsuccessfully ended.

Thereafter, it is determined whether the password serial number is greater than the stored value (step S63). If the determination is negative, rewriting of registration information is not permitted (step S66), and the present routine is unsuccessfully ended.

If determinations described above are all affirmative, the stored password serial number is updated (step S64), rewriting of registration information is enabled (step S65), and the present routine is successfully ended.

In the above process, the password may be allowed to be used only once by a particular device.

The management of the number of times registration information is rewritten in Example 2, or the management of the frequency at which registration information is rewritten in Example 3, may be performed by the password issuer instead of the content usage control apparatus 100 located at an end user site such as a home. In this case, the password issuer has a database in which the number of times registration information has been rewritten or the date/time of rewriting is described for each apparatus identification information, and the password issuer performs processes shown in FIGS. 8 to 11 each time rewriting of registration information is performed.

Two or more techniques described in Examples 2 to 5 may be combined. For example, rewriting of registration information is allowed to be performed up to three times each time "rewrite permission" is acquired.

EXAMPLE 6

The limitation imposed on registration is allowed to be changed. For example, as a service which needs payment, the maximum number of times registration information may be allowed to be rewritten is changed from 5 to 10.

EXAMPLE 7

To change the limitation imposed on registration, it is required to acquire permission to change the limitation from an external device or a predetermined manager. For example, a password or a key data is acquired via a telephone, the Internet, a postal mail, or a storage medium or via voice, and changing of the limitation is enabled when it is directly or indirectly determined that permission is granted.

FIG. 16 shows a sequence in which a user of the content usage control apparatus 100 requests an issuer of permission information to provide a password needed to change the limitation on registration.

The user transmits a password request together with unique apparatus identification information (for example, inscribed on the device) to the issuer of rewrite permission information. In response, the issuer creates a password on the basis of the received apparatus identification information and a password serial number managed by the issuer.

FIG. 17 shows an example of a format of a password. In the example shown in FIG. 14, the password includes apparatus identification information, a password serial number, information indicating how to change the limitation, and digital signature data. The digital signature data may be produced using a public key encryption technique on the basis of the apparatus identification information and the password serial number.

If the user receives the password, the user inputs the received password into the device and performs an operation to rewrite registration information. The content usage control apparatus 100 performs the process shown in FIG. 12 to determine whether changing of limitation on registration is allowed.

Figure 18:
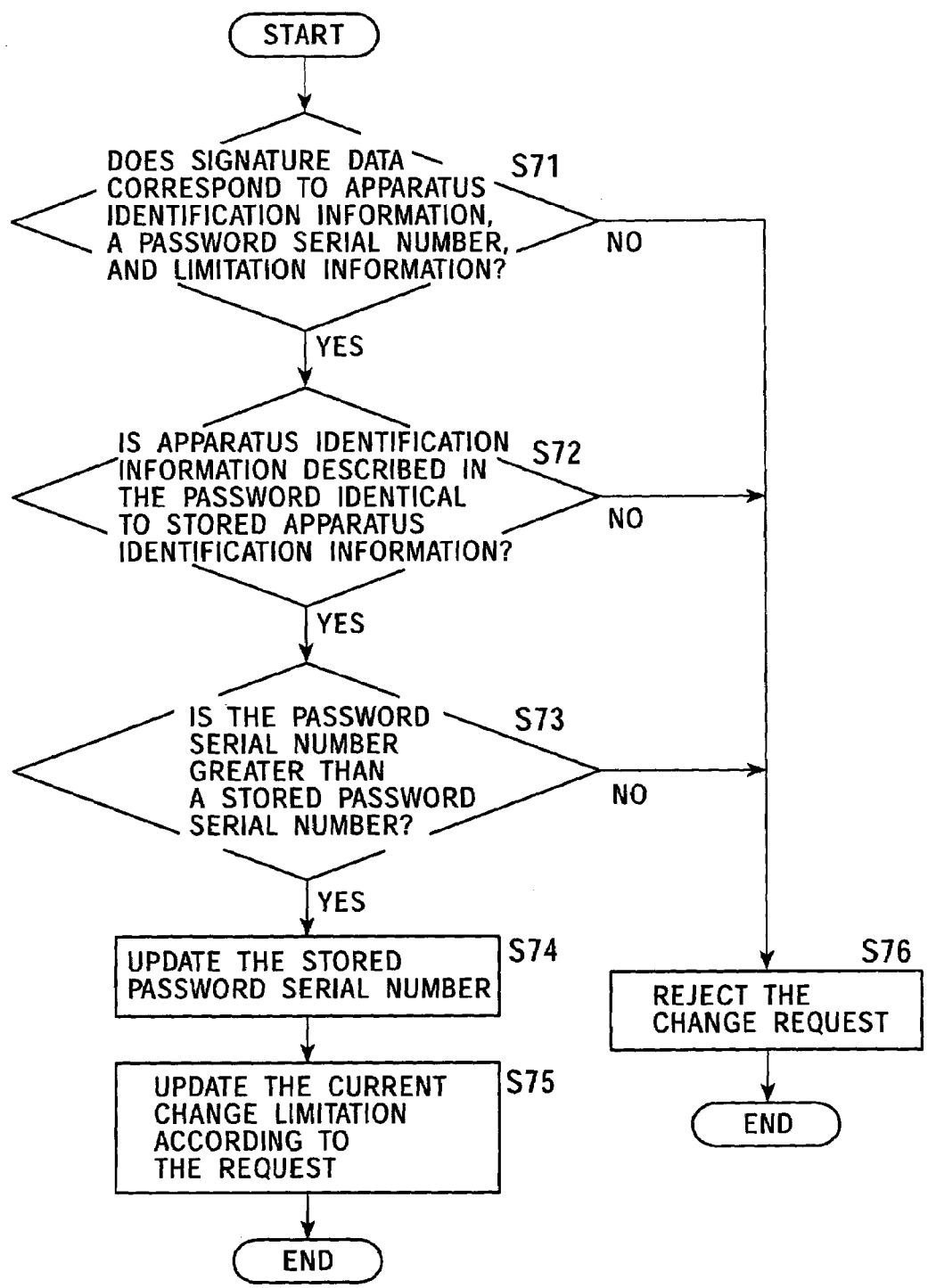
FIG. 18 is a flow chart showing a process of determining whether a password is valid.

FIG. 18 shows, in the form of a flow chart, a process of determining whether a password produced in the above-described manner is valid. Herein it is assumed that the content usage control apparatus 100 has, in the storage unit 102, information (such as a public key of the issuer of permission) necessary in verification of digital signature data and apparatus identification information. It is also assumed that the password serial number is initially set to 0.

First, it is determined whether the digital signature data is consistent with the apparatus identification information and the password serial number (step S71). If the determination is negative, changing of the limitation on registration is permitted (step S76), and the present routine is unsuccessfully ended.

Thereafter, it is determined whether the apparatus identification information included in the password is identical to the corresponding stored apparatus identification information (step S72). If the determination is negative, changing of the limitation on registration is not permitted (step S76), and the present routine is unsuccessfully ended.

Thereafter, it is determined whether the password serial number is greater than the stored value (step S73). If the determination is negative, changing of the limitation on registration is not permitted (step S76), and the present routine is unsuccessfully ended.

If determinations described above are all affirmative, the stored password serial number is updated (step S74), changing of the limitation on registration is enabled (step S75), and the present routine is successfully ended.

EXAMPLE 8

Provision of a particular service to an apparatus user whose identification information is already registered is controlled without changing the registration information.

For example, when a registered apparatus is stolen or lost, it is possible to disable provision of the service to that apparatus thereby preventing the service from being illegally received.

For example, as shown in FIG. 7, an invalidation flag associated with each registered apparatus or user is set by a user, and the content usage control apparatus 100 enables or disables provision of contents to the apparatus or the user depending on the invalidation flag.

The present invention has been described in detail above with reference to particular embodiments. It will be apparent to those skilled in the art that various modifications and substitution to those embodiments are possible without departing from the spirit and scope of the invention. That is, the embodiments have been described above by way of example and not limitation. The scope of the invention is to be determined solely by the appended claims.

As described above in detail, the present invention provides a method, an apparatus, and a computer program for controlling use of a content acquired via a network or the like, under the management of a particular server manager.

The present invention also provides a method, an apparatus, and a computer program for controlling use of a content managed by an end user so that the content is prevented from being illegally used.

The present invention also provides a method, an apparatus, and a computer program for controlling use of a content managed by an end user of a home network or the like so that the content is prevented from being freely distributed or provided against a predetermined usage condition.

For example, the present invention is useful to control an apparatus capable of outputting fee-charging contents such as movie contents or music contents such that contents are provided to only limited authorized users thereby preventing the contents from being illegally used by unauthorized users.

According to the present invention, the content usage control apparatus first registers identification information of authorized apparatuses or users before the content usage control apparatus starts provision of contents to the apparatuses or the users, thereby preventing the contents from being used by unauthorized apparatus or users whose identification information is not registered.

In the present invention, even if a user of the content usage control apparatus intentionally attempts to register an unauthorized apparatus or user, the limitation imposed on changing of registration prevents the contents from being illegally used with no limit.

If an external apparatus or an external user is registered, the result is to obstruct internal users such as family members or the like in using the contents. Thus, the limitation on changing of registration suppresses unauthorized registration.

By limiting usage of contents in the above-described manner, it becomes possible to prevent the contents from being illegally used and thus it becomes possible to protect the content in the manner desired by content providers. This makes it possible to provide a wide variety of services and contents.

By allowing the limitation imposed on the rewriting of registration information to be changed, it becomes possible to provide an option which allows an end user to use contents within a lower-level limitation, while allowing the holder of copyright of contents to control the use of the contents.

What is claimed is:

1. A content usage control apparatus comprising:
   acquisition means for acquiring first user identification information identifying a first user requesting use of content;
   registration means for registering the first user identification information in a database, and for subsequently registering a second user requesting use of the content by replacing the first user identification information in the database with second user identification information identifying the second user;
   change limitation means for preventing the registration means from further replacing the second user identification information in the database in accordance with a limitation on replacing user identification information, wherein the limitation is a maximum number of times user identification information can be replaced;
   limitation modifying means for modifying the limitation on replacing user identification information to increase the maximum number of times user identification information can be replaced; and
   usage control means for, in response to the request for use of the content issued by the second user, determining whether the use of the content is allowed on the basis of whether the second user identification information is currently registered in the database.

2. A content usage control apparatus according to claim 1, wherein the registration means performs registration in response to a request issued by the first user.

3. A content usage control apparatus according to claim 1, wherein the registration means performs new registration only when a current number of registrations is smaller than a predetermined maximum allowable number of registrations.

4. A content usage control apparatus according to claim 1, wherein the registration means stores, together with the first user identification information, an invalidation flag for controlling provision of a service to the first user; and
   the usage control means limits the use of the content by the first user if the invalidation flag associated with the first user is set.

5. A content usage control apparatus according to claim 1, wherein when the registered first user identification information is replaced with the second user identification information, the change limitation means requests the second user to perform a particular operation.

6. A content usage control apparatus according to claim 1, wherein when the registered first user identification information is replaced with the second user identification information, the change limitation means requests submission of change permission information from the second user.

7. A content usage control apparatus according to claim 1, wherein the change limitation means charges fees for changing the maximum number of times user identification information can be replaced.

8. A content usage control apparatus according to claim 1, wherein when the limitation on replacing user information is modified the change limitation means requests submission of change permission information from a different apparatus or a manager.

9. A content usage control method implemented by a computer comprising a central processing unit, the method comprising steps of:
   acquiring first user identification information identifying a first user requesting use of content;
   registering the first user identification information in a database and subsequently registering a second user requesting use of the content by replacing the first user identification information in the database with second user identification information identifying the second user;
   preventing further replacement of the registered second user identification in the database information in accordance with a limitation on replacing user identification information, wherein the limitation is a maximum number of times user identification information can be replaced;
   modifying, by the central processing unit of the computer, the limitation on replacing user identification information to increase the maximum number of times user identification information can be replaced; and
   in response to the request for use of the content issued by the second user, determining whether the use of the content is allowed on the basis of whether the second user identification information is currently registered in the database.

10. A content usage control method according to claim 9, wherein registration is performed in response to a request issued by the first user.

11. A content usage control method according to claim 9, wherein new registration is performed only when a current number of registrations is smaller than a predetermined maximum allowable number of registrations.

12. A content usage control method according to claim 9, wherein an invalidation flag for controlling provision of a service to the first user is stored together with the first user identification information; and
   the use of the content by the first user is limited, if the invalidation flag associated with the first user is set.

13. A content usage control method according to claim 9, wherein when the registered first user identification information is replaced with the second user identification information for a second client, the second user is requested to perform a particular operation.

14. A content usage control method according to claim 9, wherein, when the registered first user identification information is replaced with the second user identification information, submission of change permission information is requested from the second user.

15. A content usage control method according to claim 9, further comprising charging fees for changing the maximum number of times user identification information can be replaced.

16. A content usage control method according to claim 9, wherein when the limitation on replacing user information is modified, submission of change permission information is requested from a different apparatus or a manager.

17. A computer-readable storage medium containing processor readable instructions for causing a processor to execute a method comprising:

acquiring first user identification information identifying a first user requesting use of content;

registering the first user identification information in a database and subsequently registering a second user requesting use of the content by replacing the first user identification information in the database with second user identification information identifying the second user;

preventing further replacement of the registered second user identification in the database information in accordance with a limitation on replacing user identification information, wherein the limitation is a maximum number of times user identification information can be replaced;

modifying the limitation on replacing user identification information to increase the maximum number of times user identification information can be replaced; and in response to the request for use of the content issued by the second user, determining whether the use of the content is allowed on the basis of whether the second user identification information is currently registered in the database.

18. The content usage control apparatus according to claim 1, wherein the limitation is stored in a tamper proof storage unit that physically prevents the limitation from being overwritten from outside the content usage control apparatus.

* * * * *

UNITED STATES PATENT AND TRADEMARK OFFICE
CERTIFICATE OF CORRECTION

PATENT NO. : 7,614,087 B2
APPLICATION NO. : 10/667872
DATED : November 3, 2009
INVENTOR(S) : Takehiko Nakano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Nineteenth Day of October, 2010

David J. Kappos
*Director of the United States Patent and Trademark Office*